United States Patent [19]
VanNess

[11] 4,335,448
[45] Jun. 15, 1982

[54] ELECTRONIC CONTROL SYSTEM

[75] Inventor: Bradford O. VanNess, Paradise Valley, Ariz.

[73] Assignee: Engineered Systems, Inc., Tempe, Ariz.

[21] Appl. No.: 251,310

[22] Filed: Apr. 6, 1981

Related U.S. Application Data

[63] Continuation of Ser. No. 13,007, Feb. 21, 1979, abandoned.

[51] Int. Cl.³ .................. G06F 3/04; G06F 15/20
[52] U.S. Cl. ............................. 364/900; 364/465
[58] Field of Search ... 364/200 MS File, 900 MS File, 364/119, 465, 478, 479; 222/2, 26; 371/15, 22, 62; 235/92 AC, 92 FL, 381

[56] References Cited

U.S. PATENT DOCUMENTS

| | | | |
|---|---|---|---|
| 3,697,961 | 10/1972 | Banks | 364/900 |
| 3,890,494 | 6/1975 | Meshek et al. | 364/119 |
| 3,969,703 | 7/1976 | Kwiatkowski et al. | 364/900 |
| 3,997,879 | 12/1976 | Markley et al. | 364/900 |
| 4,034,193 | 7/1977 | Jackson | 364/465 |
| 4,052,702 | 10/1977 | Smith et al. | 364/200 |
| 4,084,232 | 4/1978 | Woods et al. | 364/200 |
| 4,085,313 | 4/1978 | Van Ness | 235/381 |
| 4,118,792 | 10/1978 | Struger et al. | 364/900 |

OTHER PUBLICATIONS

Ciancios, M. N. et al., "Multifunction Timer", IBM Tech. Discl. Bull., vol. 19, No. 11, Apr. 1977, pp. 4366-4368.

*Primary Examiner*—Gareth D. Shaw
*Assistant Examiner*—Thomas M. Heckler
*Attorney, Agent, or Firm*—LaValle D. Ptak

[57] ABSTRACT

An electronic control system particularly suited for use with an automatic fuel dispensing system uses a centrally located computer to supply serial polling signals to various sub-stations. At the sub-stations, the polling signals are decoded into signals used to control the operation of specific system relays operated by the system. The status of the decoded polling signals as well as the operating status of the relays is supplied back to the computer for verification. A time-out control circuit continuously monitors the input polling signals applied to the relay terminal. If activity does not appear on the input signal line at the terminal after a pre-established time interval, all of the system relays at that terminal are turned off or rendered inoperative, irrespective of the status of the relay control signal obtained from the output of the polling signal decoding circuit. As a consequence, if the remotely located computer should fail to properly operate for any reason, the system is placed in a "fail-safe" standby condition of operation.

10 Claims, 4 Drawing Figures

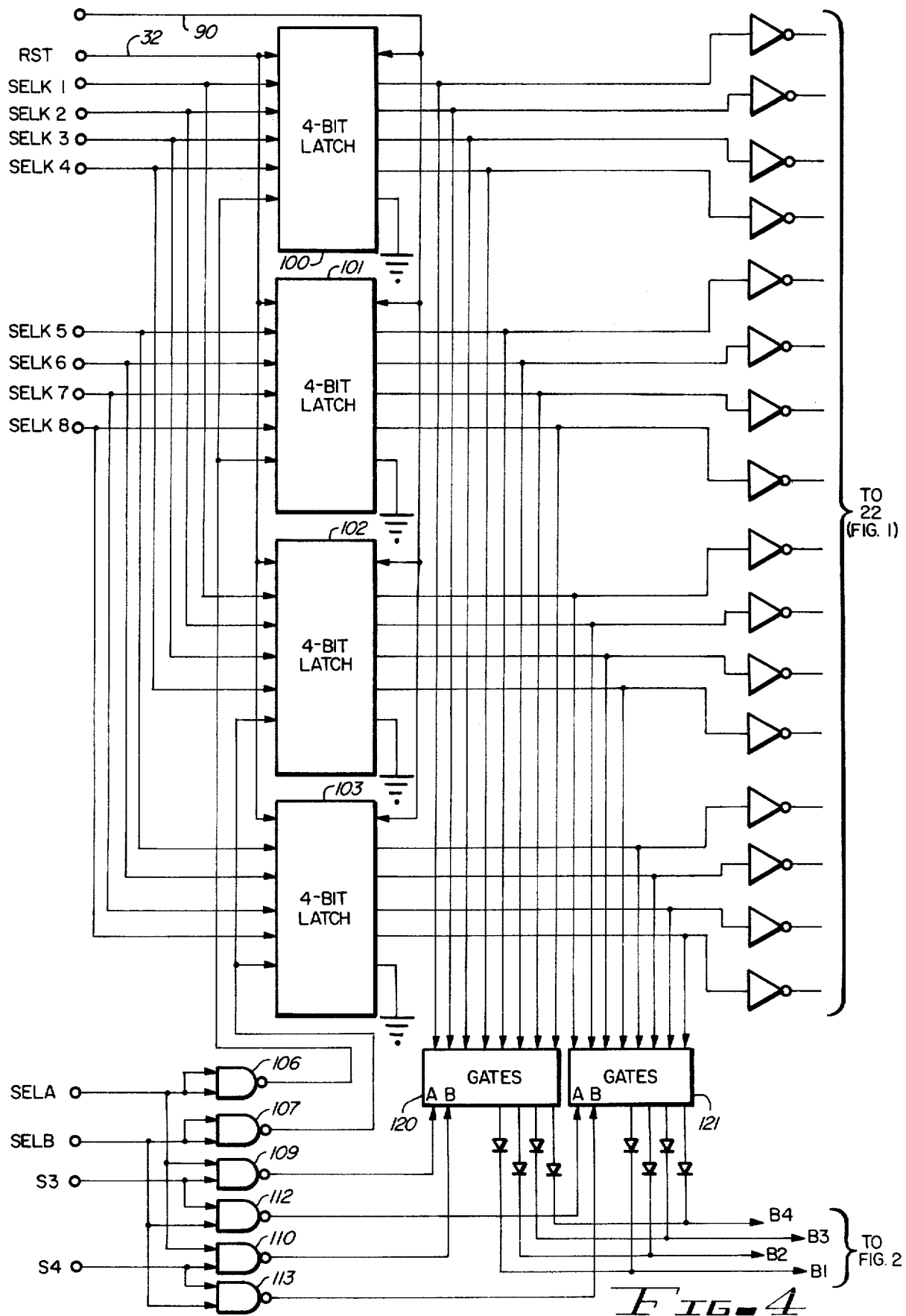

ELECTRONIC CONTROL SYSTEM

This is a continuation of application Ser. No. 13,007, filed Feb. 21, 1979, and now abandoned.

RELATED PATENTS

The system disclosed herein is related to the type of automatic fuel dispensing system disclosed in U.S. Pat. No. 4,085,313 to Bradford VanNess and assigned to the same assignee as this application.

BACKGROUND OF THE INVENTION

Automated fuel dispensing systems and semi-automated fuel dispensing systems have been devised to permit unattended or semi-unattended purchases of fuel by authorized customers of such systems. Customers using systems of this type typically include municipalities, large trucking companies, and the like. When only a single customer uses a given facility, control of the fuel dispensing facility is relatively simple. When the system, however, is required to serve many different customers or a single customer with a large number of drivers and vehicles, it generally is necessary to have an attendant on duty at a central location in the station for billing purposes. Typically systems of this latter type are the commonly known "self-service" gasoline stations which have a central location manned by an attendant who monitors volume readers and the pump turn-on switch controls for the fuel pumps located at the station. The customers pump their own fuel and then go to the central location to pay for the fuel or otherwise take care of the billing.

Fully automatic self-service fuel dispensing systems have been developed in which a credit card or specially prepared document is inserted into a card reader to cause selected data from the card to be transmitted to a remote central computer for verification. If the document is verified as an authorized document, the system then permits the withdrawal of fuel under the control of the credit card. The quantity of the fuel withdrawn is monitored; and upon completion of the transaction, data representative of this quantity is transmitted by the local controller along with the credit card identification to the central computer for processing on the particular account number indicated by the credit card being used. While such a system permits the completely unattended operation of a fuel dispensing service station for customers having credit cards usable in the system, it requires committed transmission links between the location of the fuel pumps and the central computer location.

An improvement is fully automatic self-service fuel dispensing systems which localizes the credit card identification and verification check of such credit cards is disclosed in the above mentioned related patent. That system includes logic circuitry at a local control console associated with the card reader for identifying and verifying the credit card as well as controlling and recording the data relative to the transaction itself. A store and forward memory then is utilized to temporarily store the information relative to each transaction until that information is to be forwarded to a central computer for further processing.

In systems of the type disclosed in the above identified related patent, variations include the use of a local computer or microprocessor at a central location within the fuel dispensing station itself. For example, a number of card readers each can be located in a different fuel pump island within the terminal for individually controlling a group of fuel dispensing pumps or the like. Typically a single card reader is used to control four or more pumps at an individual island. A number of such islands, all linked with the central computer at the station, are used in a large automatic bulk fueling station.

Operation of the system relays which actually control the ultimate dispensing of fuel from the various fuel pumps and the like is effected through decoding of the data at the card readers by the central computer. The central computer then supplies serial polling signals in some pre-established sequence over a polling signal line to the different control terminals at each of the islands. At the islands, the polling signals are decoded to uniquely operate the relays at the island in accordance with the signals supplied to it. Generally such systems include an automatic turn-off or shut down of the relays in the event of power failure or the like. Situations exist, however, where a failure of the computer may occur without a power failure at the station. In such an event, it is desirable to render the system relays at each of the islands inoperative to prevent spillage of fuel or unauthorized withdrawal of fuel whenever such a failure occurs. In addition it is desirable to continuously monitor the status of operation of all of the relays at the various island consoles or sub-terminals at the central computer to insure that the operation as it actually exists is in accordance with the polling signals supplied from the computer to the various terminals to initiate the operation.

SUMMARY OF THE INVENTION

Accordingly, it is an object of this invention to provide an improved electronic control system.

It is another object of this invention to provide an electronic control system for use in conjunction with a utilization circuit rendered operative by decoded polling signals.

It is an additional object of this invention to provide an electronic control system for use with a utilization circuit controlled by polling signals received at a location associated with the utilization circuit for monitoring activity on the polling signal input line and rendering the utilization circuit inoperative whenever polling signals fail to appear on the polling signal input line for a pre-established time interval.

In accordance with a preferred embodiment of this invention, an electronic control system includes at least one utilization circuit which is selectively rendered operative and non-operative under the control of a driver circuit. The driver circuit in turn is operated in response to the output of a polling signal decoder which responds to unique polling signals applied to its input terminal to produce an output signal to the driver circuit for ultimately operating the utilization circuit. A control circuit is connected to monitor the signals on the polling signal input line applied to the polling signal decoder to render the utilization circuit inoperative in the absence of signals appearing on the polling signal input line for a pre-established time interval.

BRIEF DESCRIPTION OF THE DRAWINGS

FIG. 4 shows details of the relay driver circuit 21 and verification circuit output to the serializer circuit 25 of FIG. 1.

DETAILED DESCRIPTION

Figure 1:
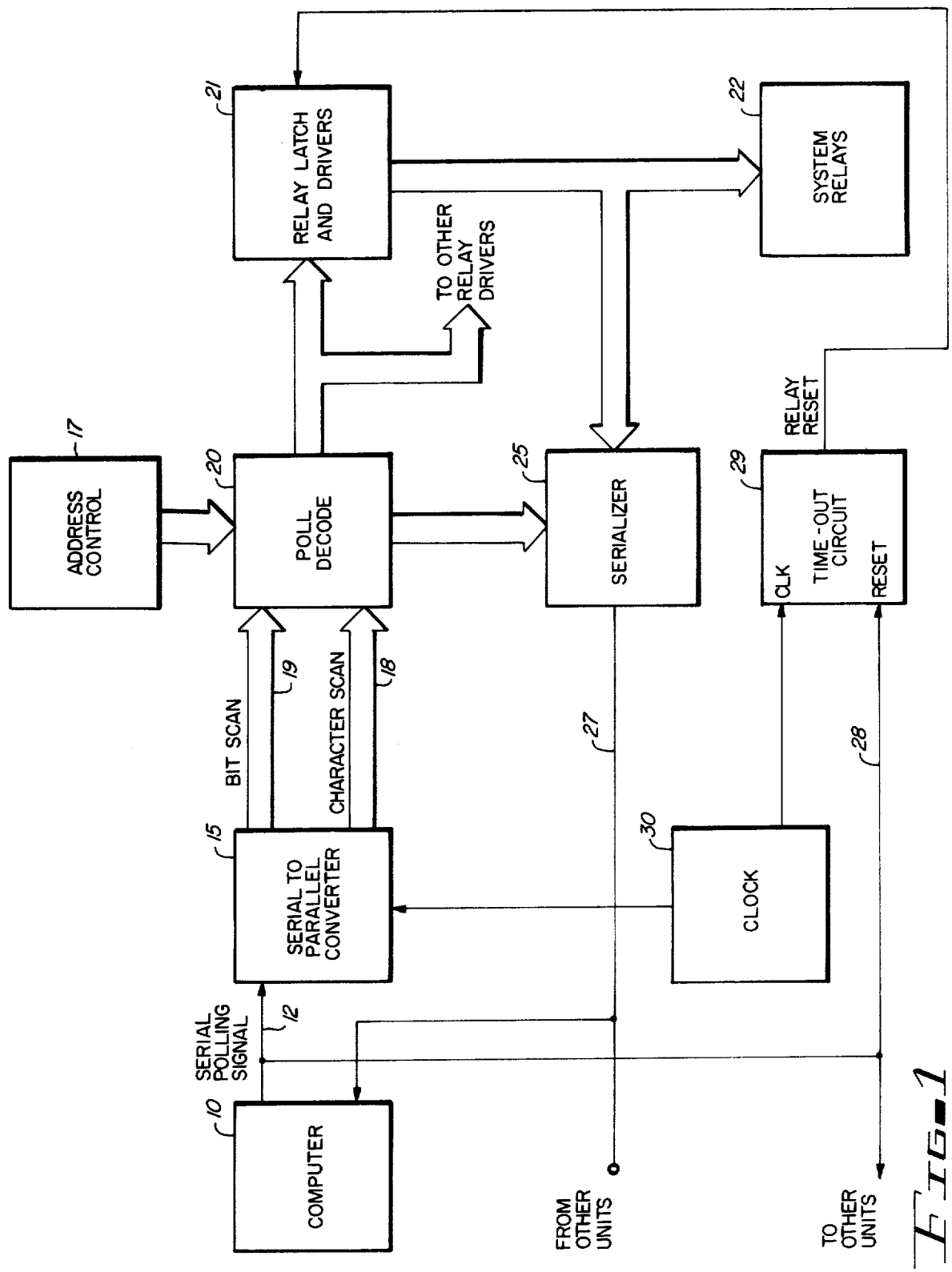
FIG. 1 is a block diagram of a preferred embodiment of the invention.

Reference now should be made to the drawings where the same reference numbers are used throughout the several figures to designate the same or similar components. FIG. 1 is an overall block diagram of a preferred embodiment of the system ideally suitable for use with an automatic fuel dispensing system. Each station or terminal in the system is controlled by a computer 10 which may be individually and uniquely located at a central operating point within the specific terminal, or the computer 10 may be at some remote central location and used to control a number of widely separated bulk fueling terminals.

Specific operating information for operating particular relays at the fuel dispensing locations in a bulk terminal station is supplied in the form of polling signals over a polling signal input lead 12 to the control consoles in each different fuel pump island or dispensing location. This information may be originated in the central computer 10 itself, or it may originate by the operation of a card reader terminal of the type disclosed in the above mentioned U.S. Pat. No. 4,085,313. If a card reader system of the type disclosed in the '313 patent is used, the information first is supplied to the computer 10 which then transforms the information into the desired serial polling signal supplied over the input lead 12. This polling signal generally is in the form of a continuous serial stream of binary signal information specifically identifying particular bulk fueling terminals (if the computer controls more than one terminal) and the specific fueling islands or control centers within a terminal, down to the specific system relays at each of the islands for effecting the desired operation of the equipment and the delivery of the fuel located there. Under normal operation of the system, the polling signals continuously appear on the lead 12.

The polling signals at a local island or fueling station at a bulk fueling terminal are applied to the input of a serial-to-parallel converter 15 which transforms the serial signals into a pair of parallel output signal groups identified as a character scan group 18 and a bit scan group 19 as illustrated in FIG. 1. These two parallel groups of decoded signals then in turn are applied to corresponding inputs of a poll decoder circuit 20 which responds to the groups to operate the utilization circuitry at the terminal if the unique address identifying the group of system relays controlled by the terminal is decoded by the poll decoder circuit 20. If the specific poll decoder circuit 20 for the particular portion of the system shown in FIG. 1 is not uniquely addressed by the signals applied to it from the converter 15, no operation of the remainder of the circuit shown in FIG. 1 takes place for the particular station or terminal shown.

For each group of system relays at a fuel pump island controlled by the computer 10, there is a separate poll decoder circuit 20 coupled to the output of an associated serial-to-parallel converter circuit 15, as shown in FIG. 1. Thus a single computer 10 simultaneously may be supplying polling input signals over a lead 12 to several different converters 15 and their associated poll decoder circuits 20. Each poll decoder circuit 20 then operates to uniquely identify specific groups of relays and then the particular relays within each group for operation at the location controlled by that poll decoder circuit 20. Typically, in a system which has been operated, each poll decoder circuit 20 uniquely controls the operation of eight different groups of eight relays each (for a total of 64 relays).

The output of the poll decoder circuit 20 is a parallel encoded group of signals which uniquely identifies for operation the particular relay latch and driver circuits 21 for the selected relay group, and within the group, the individual relay or relays of the group which are to be operated by the relay latch and driver circuit 21. Thus under normal conditions of operation of the system, the system relays 22 are selectively turned on and off, or rendered operative and inoperative, in accordance with the changes in the signal applied to the system over the serial polling signal input line 12 from the computer 10.

Typically, the computer 10 includes circuitry for verifying the operation of the system in accordance with the data sent out over the polling signal line 12. To accomplish this, the output of the poll decoder 20 and the outputs of the relay latch and driver circuit 21 are applied to a serializer circuit 25, which in turn produces a serial verification output data signal stream on an output lead 27 connected back to the computer 10. The computer 10 includes comparison circuitry to compare the data received by it over the lead 27 with the source of data supplied by it over the polling signal lead 12. The manner in which this verification is made as well, as its utilization, may take on any of a number of conventional approaches. Typically, if there is a failure of verification, an alarm condition is established at the computer terminal 10. If such an alarm condition does exist, automatic termination of system operation or manual intervention, as desired, may be effected. The particular utilization made of the verification signals on the lead 27 is not important to an understanding of the features of the invention disclosed in this application.

Systems of the type described so far in conjunction with FIG. 1 generally include some type of "fail-safe" shut down in the event of a power failure or power interruption. This is necessary to turn off various ones of the operated system relays 22 in the event such relays are controlling the delivery of fuel or the like from the terminal. If a shut down system of this type were not provided, it is possible that fuel spillage or unauthorized withdrawal of fuel possibly could take place. If the computer 10, however, should fail to properly operate to continuously update and control the operation of the system relays 22, as described above, a similar problem exist. Therefore it is important to create a fail-safe alarm condition or turn-off of operated system relays 22 in the event the computer operation should fail for any reason, irrespective of whether or not there is a power failure at the pump island or terminal shown in FIG. 1.

To accomplish a return of the system operation to a standby "off" condition, a time-out circuit 29 in the form of a binary counter is used. The time-out circuit 29 has its reset input connected to the serial polling signal line 12; and each time a binary signal pulse transition appears in the signal applied from the computer 10 over the line 12, the time-out circuit 29 is reset to an initial or zero count. Clock pulses for advancing the counter of the time-out circuit 29 are applied to the counter from a clock circuit 30. The same clock circuit also is used to supply the operating clock pulse to the serial-to-parallel converter circuit 15 to synchronize operation of the signal decoding with the clock rate of the serial signal applied to the converter 15 from the line 12. The clock 30 may be synchronized in any suitable manner with the operation of the computer 10; and in some installations, the clock 30 is a common clock for all of the circuitry shown in FIG. 1 including the computer 10.

The operation of the time-out circuit 29 is selected to cause it to apply a relay reset signal over an output lead 32 in response to the application of a pre-established number of clock pulses from the clock circuit 30 following a reset pulse. The actual time interval for the circuit 29 to reach a count to produce an output signal on the lead 32 may be adjusted to satisfy the particular requirements of operation of the system in which it is used. Typically, a time of three or four seconds is used.

When a signal appears on the lead 32, it is applied to the relay latch and driver circuits 21 to reset the latches in the circuits 21 to a condition which causes the output signals from the circuit 21 applied to the system relays 22 to be such that all of the system relays are turned off or put in their normal standby condition.

Figure 2:
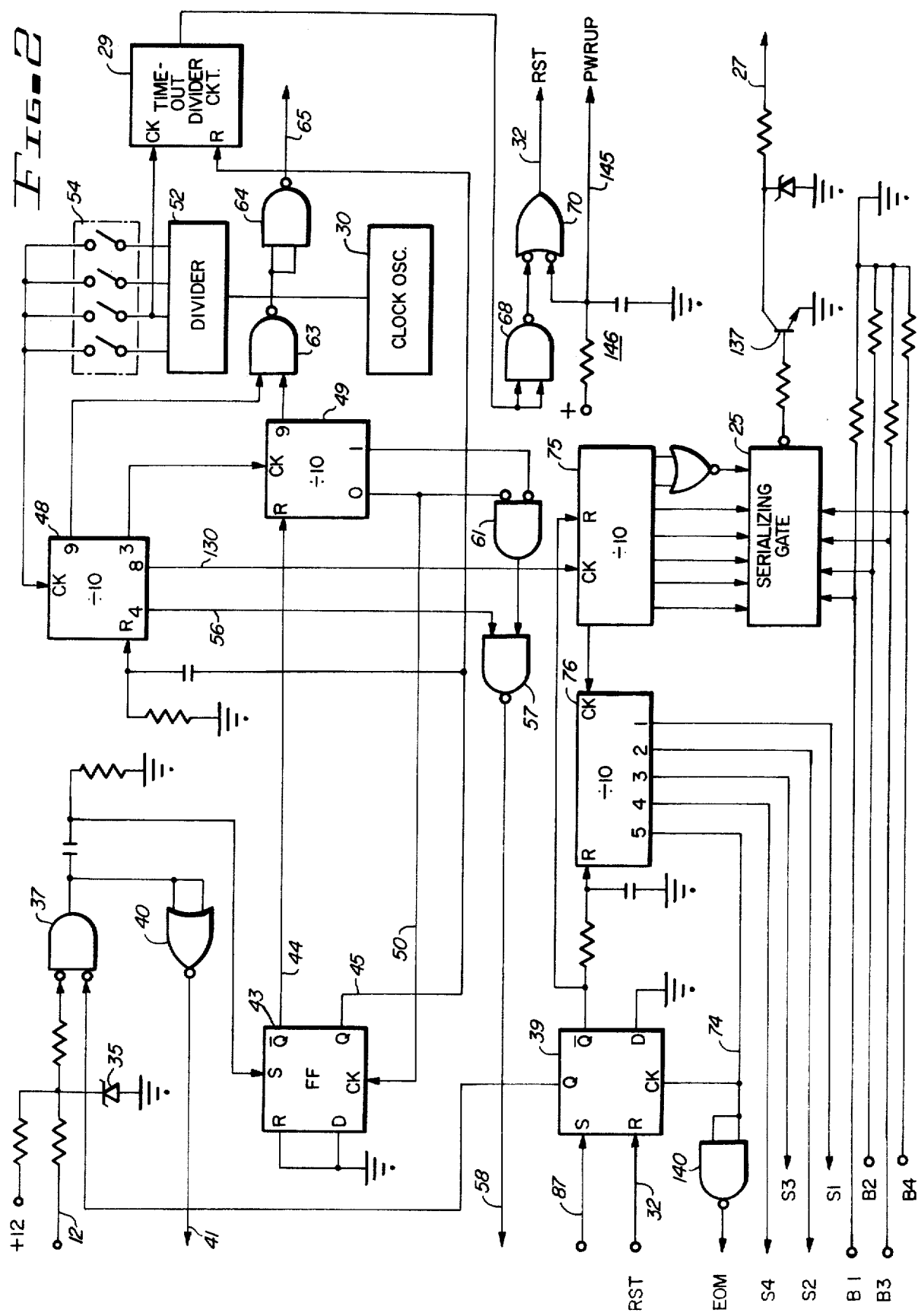
FIG. 2 shows details of circuit interconnections between lead 12, serializer 25, and time-out circuit 29 of FIG. 1.
Figure 3:
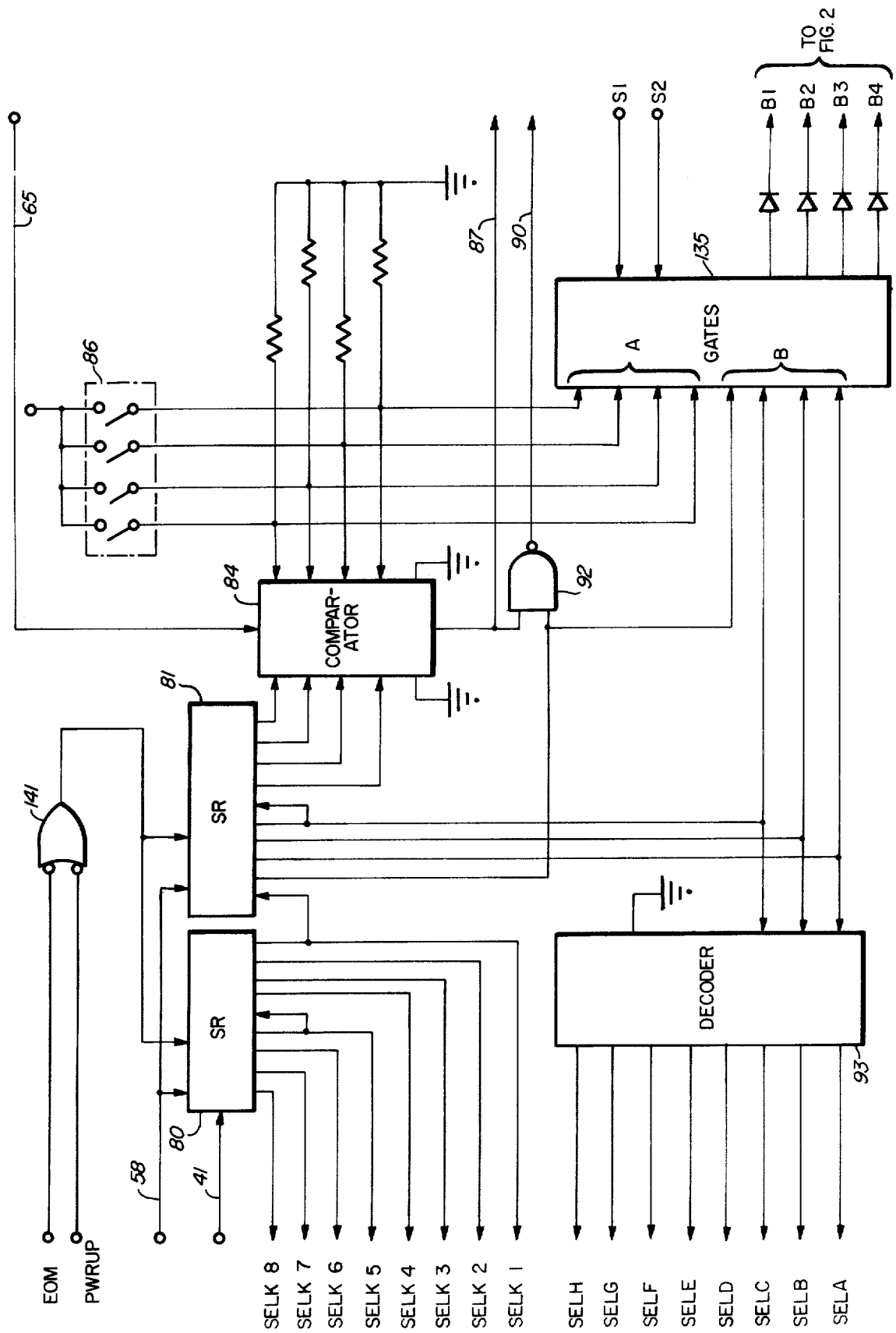
FIG. 3 shows details of the poll decoder circuit 20 of FIG. 1.

Reference now should be made to FIGS. 2, 3 and 4 which together are a detailed circuit diagram of the system shown in block diagram form in FIG. 1, with the exception of the computer 10. Reference first should be made to FIG. 2.

In FIG. 2, the polling signal input line 12, on which the serial polling signals are supplied from the computer 10, is shown in the upper left hand corner. The polling signals typically are encoded in ASCII code, with the conventional start and stop bits preceding and following, respectively, each character of the binary encoded serial signal train. A zener diode 35 is used to establish the range of the pulse voltage excursions. The signal input pulses are applied to the upper input of a two input NOR gate 37, the lower input of which is an enable input obtained from the "Q" output of a data latch control flip-flop 39.

For the purposes of this discussion, assume that the data latch flip-flop 39 initially produces a low input to the NOR gate 37. This is its normal or reset condition of operation, so that the NOR gate 37 is enabled to pass the pulse signal transitions of the serial input signal stream through to its output. The enabling of the gate 37 normally occurs in coincidence with an end-of-message (EOM) signal from the poll decoder portion of the circuit. In this state, the system shown in FIG. 2 is in a condition where it is ready and waiting for receipt of the first character of a new input signal message.

The input signal messages applied to the line 12 from the computer 10 are in the form of two character messages. In the system shown and described, the first four bits of the first character are used to uniquely identify and activate the particular card reader control console, relay group, or fuel pump island; and the next four bits of that same first character are decoded into one of eight possible decimal signals used to select one of eight groups of eight relays associated with that card reader station. The second character is used to uniquely select the individual relays out of a selected group. These relays may be selected in any number in any pattern within the eight possibilities for each group. Thus, each character of the transmitted signal appearing on the data input line 12 is an eight character binary encoded signal preceded by a start transition and terminated by a stop pulse transition of the type commonly used in ASCII serial transmission.

The pulses passed by the NOR gate 37 are supplied through an inverter 40, which in turn supplies the two character input messages to an output terminal 41 connected as the input to a two stage temporary storage shift register (FIG. 3) for further processing by the system. The operation of that register is described subsequently in conjunction with FIG. 3.

The output of the NOR gate 37 also is supplied through a differentiating circuit to the "set" input of a start bit detector flip-flop 43 to cause the flip-flop to change its reset state to its set state at the start of each received character, resulting in a negative-going signal on its output on lead 44, and to cause a positive-going signal to appear on its output lead 45.

The signal transition appearing on the output lead 45 of the flip-flop 43 is applied through a differentiating circuit to a reset input of a divide-by-ten counter 48 and the output lead 44 is applied directly to the reset input of a divide-by-ten counter 49 to release the counter 49 to commence operation of both counters from their initial or zero counts. At the end of a full count, corresponding to one received character, an output pulse is obtained from the counter 49 on a lead 50 and is applied to the clock input terminal of the flip-flop 43 to reset the flip-flop 43 to its initial "reset" condition. The signal transition on lead 45 also resets the time-out counter 29 to a zero count.

Clock pulses for operating the bit rate binary divider 48, and the character rate divider 49 are supplied by the clock oscillator 30, as described previously in conjunction with FIG. 1. The oscillator 30 preferably is a stable crystal oscillator, and a divider circuit 52 is connected to its output to produce four different output signals at different frequencies. These signals are applied to one of the terminals of a different one of four switches in a switching circuit 54, having a common output terminal. One of the switches in the switching circuit 54 is closed to select the desired baud rate of operation of the system. Typically these baud rates are 150, 300, 600 and 1200 pulses per second. The particular frequency of the clock pulses is selected to coincide with the frequency of the data supplied to the system over the lead 12. In any given system, once one of the switches in the switching circuit 54 is closed, it remains closed for the duration of the operation of the system.

The pulses at the output of the switching circuit 54 are applied to the clock input of the bit rate divider counter 48 which then supplies clock pulses at the desired bit baud rate on its various outputs. An output lead 56 is connected to the upper input terminal of a two input NAND gate 57, the output of which is used to supply shift pulses for the decoding shift register 80, 81. This output is applied over a lead 58. The NAND gate 57 is prevented from passing clock pulses during the start bit of the characters of the incoming serial message by means of a control input applied to its lower input from the output of a NAND gate 61. The two inputs to the NAND gate 61 are obtained from the first and second stages of the divide-by-ten character counter 49; and during the first two counts (corresponding to the first two bit counts of the bit counter 48), the output of the NAND gate 61 prevents the NAND gate 57 from passing any clock pulses. Thus, clock pulses are inhibited during the start and stop bits; but each subsequent clock pulse occurring during receipt of the incoming serial data signal are passed by the NAND gate 57 and are centered on each of the corresponding incoming eight data bits.

At the end of each character, coincidence of outputs from the dividers 48 and 49 at the inputs of a NAND gate 63 results in the formation of a sampling clock pulse. This pulse is inverted by an inverter 64 and is applied to an output lead 65 for use by the poll decoding circuit of FIG. 3. This output pulse occurs at the end of the eighth data bit of the incoming data character. The cycle then repeats. The flip-flop 43 is reset waiting for receipt of the next start pulse. The time-out divider circuit 29 is reset; and the foregoing sequence of operation, commenced by the resetting of the dividers 48 and 49 is repeated. A new character then may be received by the system.

The upper or clock input of the time-out circuit 29 is provided with pulses from one of the outputs of the clock pulse divider circuit 52. The number of stages of the divider circuit 29 is selected to cause it to produce an output signal on its output lead coupled to an inverter 68 if there should be a failure of activity on the polling signal lead 12 for some pre-established time interval. Typically this time interval is of the order of three or four seconds or the like. When the system is operating properly, serial polling input messages continuously appear on the input lead 12. As a consequence, the flip-flop 43 is continuously set and reset to apply reset pulses to the reset input of the time-out circuit 29 at regular intervals, which are less than the pre-established time-out period of the circuit 29.

If, however, serial data should cease to appear on the lead 12 for any reason, even though all other parts of the system are operative and power is applied to it, the flip-flop 43 is not set by start pulses applied to it from the output of the NOR gate 37. As a consequence, no reset pulses are applied to the time-out circuit 29; and ultimately it reaches a point where it supplies an output signal to the inverter 68. The inverter 68 in turn supplies its output to the upper one of two inputs of a NOR gate 70, which is continuously enabled, to then produce a reset signal on the lead 32. This signal is used to reset the relay latch and driver circuits 21 (FIG. 1) in a manner described in greater detail in conjunction with the circuit of FIG. 4.

The reset signal on the lead 32 also is applied to the lower or reset terminal of the data latch flip-flop 39 (FIG. 2) to cause its Q output to go low, thereby enabling the NOR gate 37 to continue to look for new incoming data applied to the system. This is one of the ways in which the flip-flop 39 is set to enable the system to respond to incoming polling input information. The other is that at the end of each message transmitted by the specific terminal under consideration, the flip-flop 39 is reset by an end-of-message (EOM) pulse applied to its clock input (CK) over a lead 74 from the output of a second one of two cascaded divided-by-ten binary dividers 75 and 76, respectively.

Reference now should be made to FIG. 3 which shows the details of the poll decoder circuit 20 of FIG. 1. Whenever the NOR gate 37 (FIG. 2) is enabled to pass the received serial data signal stream, these signals, after passing through the inverter 40, are applied to the lead 41 which serves as a data input to a two-character shift register comprising a pair of temporary 8-bit character storage registers 80 and 81, interconnected as a 16 bit shift register. The shift pulses for operating the shift registers 80 and 81 (each of which is internally grouped into two groups of four bits for purposes of description here) are obtained over the lead 58 from the output of the NAND gate 57 (FIG. 2) as described above. Thus, the inputs to these registers comprise only the data portion of the incoming message stream, in view of the fact that the shift pulses on the lead 58 are inhibited from appearing during the start and stop pulse intervals of the received characters.

When a full 16 data bits have been sequentially shifted into the registers 80 and 81, the right-hand four bits in the register 81 then comprise the first four bits of the first character. These bits are supplied to four inputs of a comparator circuit 84 for comparison with four other pre-encoded reference inputs which uniquely identify the particular terminal of the station with which this control circuit is a part. The encoding of the reference inputs is accomplished by appropriate setting of four switches in a switch bank 86 to uniquely identify this terminal to set it apart from all other similar terminals which may be controlled by the same computer 10.

After each character has been received by the system, a pulse is applied over the lead 65 from the output of the inverter 64 (FIG. 2) to an enabling input of the comparator 84. Upon receipt of the pulse on the lead 65, the two sets of four inputs to the comparator 84 are compared. If they agree, a positive pulse is applied over a start-of-message output lead 87. This pulse in turn is applied to the set input of the data latch flip-flop 39 (FIG. 2) to cause the Q output of that flip-flop to go high. This disables the NOR gate 37, and no further polling input signal pulses are passed by the NOR gate 37. Thus, no further pulses are applied over the lead 41 to the shift register sections 80 and 81.

At the same time since, this pulse occurs just after receipt of character, the flip-flop 43 is reset. Since no pulses are passed by the gate 37 for the duration of some further signal processing to be described subsequently, the character counter 49 is disabled. As a result, the gates 57 and 61 do not pass any further clock pulses over the lead 58; so that the information for the two decoded characters in the shift register 80 and 81 is temporarily stored in the position it occupied at the time the comparator 84 produced the output pulse on the lead 87.

The second four bits of the first character stored in the section 81 occupy the left-hand four output positions of the register. The leftmost one of these bits is applied to the lowermost input of the NAND gate 92. This bit is always encoded "high", so that the pulse obtained from the output of the comparator 84, when a comparison is detected, is also passed by the NAND gate 92 to its data clock output lead 90. This pulse then is used to latch data into the four-bit latch circuits of FIG. 4 in a manner more fully described subsequently.

The other three bits of this second portion of the first character of the input message are applied to the three right hand lower inputs of a binary to decimal decoder circuit 93 which decodes the binary information contained on these three outputs into the corresponding one of eight different decimal outputs, SELA to SELH. The particular one of these outputs which is supplied with a positive or high output potential by the decoder 93 designates the selection of the desired one of the eight groups of relays identified by the encoding of the second four bits of the first input message character.

The eight bits of the second message character stored in the shift register section 80 each correspond to the selection of the operating condition (on or off) of the eight relays in the selected group of relays designated by the output of the decoder circuit 93. None, or all, or any combination of the eight outputs SELK 1 to SELK 8 may have a positive or enabling potential applied to them from the outputs of the shift register section 80. Each of these outputs individually controls a selected relay through the circuitry of FIG. 4.

Reference now should be made to FIG. 4, which shows the relay driving circuitry and the verification circuit outputs from the relay drivers to the serializer circuit 25, described generally above in conjunction with FIG. 1. The circuit of FIG. 4 shows two of the eight relay groups which are selected by the decoder 93 along with the relay driver circuits for the eight relays of each of these groups (showing a total of 16 relay drivers in FIG. 4). The other six groups of eight relays each, are all organized by pairs of groups in the same manner as those shown in FIG. 4, but these additional groups have not been shown to avoid unnecessary repetition. It is to be understood, however, that each of the remaining six groups of relays are organized in two group units identical to the unit shown in FIG. 4 and are similarly selected by different address codes in accordance with the output of the decoder circuit 93 (FIG. 3).

The control of the turning on and the turning off of the relays is effected by four-bit binary latch circuits 100, 101, 102 and 103. The latch circuits 100 and 101 each control four relay driver amplifiers for a total of eight amplifiers in relay group A. Similarly the latch circuits 102 and 103 control the eight relay drivers for the relay group B. The selection leads SELA and SELB from the output of the decoder 93 (FIG. 3) are applied to a respective pair of inverters 106 and 107 for enabling the respective two groups of latch circuits 100, 101 or 102, 103 in accordance with the output of the decoder 93 of FIG. 3.

The A and B selection inputs also each are applied to a pair of two input NAND gates. The SELA input is connected to the upper input of NAND gates 109 and 110. Similarly the SELB input is connected to one of the inputs of each of the NAND gates 112 and 113. The other input to the NAND gates 109 and 112 is the S3 output of the divide by 10 group selection divider circuit 76, and the other input to the NAND gates 110 and 113 is the S4 output of the divider circuit 76 of FIG. 2. The operation of the NAND gates 109, 110, 112 and 113, in conjunction with a pair of dual section gating circuits 120 and 121, is described subsequently in conjunction with the operation of the system when it is supplying a serial verification signal back to the computer 10.

As is readily apparent from an examination of FIG. 4, the eight outputs from the second character storage stage 80 of the shift register 80, 81, are applied to the respective latches of each of the two groups shown in FIG. 4 (similar connections are made to the latches for the other groups of relays, which are not shown). No change in the status of any data stored in the latch circuits 100 to 103, however, is made unless these latch circuits are specifically addressed or enabled by the outputs of their corresponding inverters 106 and 107. For example if the SELA lead has a selection signal applied to it from the decoder 93 (FIG. 3) the output of the inverter 106 is such that it enables the four bit latches 100 and 101 for operation upon receipt of the next data clock or data storage pulse on the lead 90. As described previously, this pulse is obtained from the output of the NAND gate 92 of FIG. 3 when the particular control console with which these groups of relays ae associated is identified and selected by the poll decoding circuitry shown in FIG. 3. When this pulse appears and is applied to the enabled binary latches 100 and 101, the latches are set to store selectively the relay operation (on or off) information applied to them over the input leads SELK1 to SELK8. The outputs of the binary latches then either remain the same as they were previously, if there is no change in input data, or they change to reflect the change in input data. These output are applied to the corresponding bank of relay driver amplifiers for the selected relays shown on the right hand side of FIG. 4. The relay driver amplifiers then selectively operate or turn off selected ones of the system relays 22 (FIG. 1) in accordance with the system operation. The particular relays which are enabled depend upon which one of the different groups of latch circuits is selected by the selection signals from the output of the decoder 93; and in addition, upon the status of the individual relay selection information supplied to the latch circuits from the outputs of the shift register stage 80, connected in common to all of the latch circuits for all of the eight groups of relays at the particular station location involved.

The operation of the counters 75 and 76 shown in FIG. 2 now should be considered. The counter 75 comprises a bit scanning counter and, in conjunction with the operation of a character scanning counter 76, determines the sequence of the verification data supplied back to the computer 10 over the lead 27. As described previously, the counters 75 and 76 are reset by the output of the data latch flip-flop 39 when it operates in response to a start-of-message signal supplied to it from the output of the comparator 84. The counter 75 then is permitted to advance in its count under control of the output of the bit counter 48 by pulses applied to it over a lead 130.

Initially, the counter 76 also is set to supply an enabling output over its S1 lead. This lead is applied to the S1 enabling input of a dual-section coincidence gating circuit 135 (FIG. 3) to cause the four parallel outputs of the gating circuit 135 to correspond to the address or station identification information set by the switches 86. This information is applied over the four output leads B1 through B4 to the lower inputs of the serializing gating circuit 25 (FIG. 2). As the bit counter divider circuit 75 is advanced in its count, it causes the gating circuit 25 to incorporate these four bits of information with additional bits of information (which are always constant) into serial ASCII encoded characters. The circuit 25 serially applies the characters to a buffer amplifier output transistor 137, the collector of which is connected to the verification signal output lead 27.

After the first verification character has been transmitted in this fashion, the counter 76 advances to its next count and enables the S2 output. This output also enables the lower section (section B) of the four input dual gating input circuit 35 to connect its output with the four inputs corresponding to the relay group binary encoded information. This information then is supplied to the leads B1 through B4 and encoded serially in the ASCII code in the same manner as the first group of four bits.

Similarly when the S3 step is reached by the counter 76, the gates 109 and 112 are enabled and, depending upon which group of relays has been selected, one or the other of these gates (or a similar gate for one of the relay groups not shown) passes an enabling signal to the "A" section of a respective dual section coincidence gate 120 or 121. If relay group A has been selected, the gate 120 interconnects the four outputs from the latch 100 with the gate outputs during this time interval. These outputs then are serialized as described above. After this character count has been completed, the divider 76 moves to its next count, enabling output S4. The S4 output applied to the gates 110 and 113 of FIG. 4 then enables the corresponding B section of one or the other of the gates 120 and 121 in accordance with which relay group is selected. This then interconnects the binary latch outputs for the second four relays of the selected groups to the outputs of the gate; and, for a selected group A, causes the outputs of the latch circuit 101 to be interconnected by the gate 120 to the B1 through B4 outputs for serializing, as described previously.

After this character has been fully serialized under control of the counter 75, the character counter 76 then moves to step 5 producing an output pulse on lead 74. This causes an end-of-message (EOM) output pulse to be obtained from an inverter 140 (FIG. 2) and this pulse is applied to a NOR gate 141 (FIG. 3) to reset or clear the shift registers 80 and 81 to an initial condition. Thus, all of the outputs which previously were used from these registers to effect the relay group and individual relay selections, along with the poll decoding output are removed from the system.

At this time, it also should be noted that when operating power is first applied to the system, precaution must be taken to insure the system relays 22 are off or inoperative. This is accomplished through the signal applied on a "power up" (PWRUP) lead 145 connected to the lower inputs of the gates 70 (FIG. 2) and 141 (FIG. 3). This signal is delayed by an integrating circuit 146 to insure reset pulses are applied to the shift register 80, 81 and the reset lead 32 when the system initially is powered up.

The pulse appearing on the lead 74 also is applied to the clock input of the data latch flip-flop 39 to cause it to change state, thereby removing the inhibiting output applied to the lower input of the NOR gate 37 to permit the NOR gate 37 once again to pass the serial data polling signals appearing on the polling input lead 12 from the computer 10. The system then processes the information in the same manner described above. If the polling signal indicates some change in the data for the particular control console or station involved, the changed data is stored in the shift register sections 80 and 81 and is decoded to correspondingly change the state of the latch circuits of FIG. 4 either to turn on previously turned off relays or vice versa. The system continuously operates in this manner to update the state of operation as demanded in accordance with the signals applied to it over the polling signal input lead 12.

Each time information is decoded and updated by the system, a full verification signal is sent back serially over the lead 27 under the control of the operation of the bit and character counters 75 and 76 of FIG. 2. If there is a failure of verification of the received data with the transmitted data at the computer 10, appropriate action can be taken automatically or by manual intervention at the computer to correct the defect. This may be in the form of a set of signals sent over the polling signal line 12 to turn off all of the relays at the station for which verification was not received. Another approach, which optionally may be utilized, is to retransmit the original polling information; and if verification then is obtained, to go ahead and operate in a conventional normal manner. If there is a second or a third failure of verification, the system then can be placed in an alarm mode to permit appropriate action to be taken.

Continuously during the above mentioned normal operation of the system, the time-out divider circuit 29 is reset each time the start bit detection flip-flop 43 is set after detection of the presence of a start bit in the output of the data signal supplied through the NOR gate 37. The computer 10 operates continuously to poll and monitor the various station consoles in the system of which the circuit shown in FIGS. 2, 3 and 4 is associated at time intervals selected to be less than the time-out period of the time-out divider circuit 29. If for some reason there is a failure at the computer 10 to transmit polling information at such regular intervals, the time-out divider circuit 29 is permitted to time-out and cause the application of a reset signal on the output lead 32. Whenever this reset signal occurs, it is applied to a reset input of each of the latch circuits 100 through 103 of FIG. 4. This places the latch circuits in a state to render inoperative or to turn off all of the relays operated by the relay driver circuits connected to the outputs of the latch circuits. This signal overrides the other signals applied to the latch circuits 100 to 103, irrespective of the state of the operation of the remainder of the system.

Even if the particular station which is illustrated in the drawings is not selected by the poll detector comparator 84 (FIG. 3), the setting of the start bit decoder flip-flop 43 under control of the output signals from the NOR gate 37 and the operation of the bit rate and character rate counters 48 and 49 continuously resets the time-out circuit 29 to prevent any change in the status of the relays controlled by the particular station console shown. So long as there is polling activity on the polling input line 12, the system operates in a normal fashion. Only if this activity fails to exist for a pre-established period of time, is the time-out divider circuit 29 permitted to operate to shut down or turn off the relays of the system in an alarm condition.

The system which has been described above in conjunction with the schematic diagram of a preferred embodiment is to be considered illustrative of the invention and not limiting. It operates to provide continuous verification of the polling signal data in a serial mode for the computer 10; so that the received information, as decoded by the system, is continuously compared with the transmitted information. If a discrepancy exists, appropriate action can be taken. Similarly even though a power failure may not occur at the local station consoles being controlled by the signals from the computer 10, the system operates to place all of the relays or utilization circuits controlled by all of the consoles in a "fail safe" or "off" condition of operation if activity from the computer is not continuously present for some minimum time interval. The time interval which is utilized in any particular system may be varied in accordance with the desired operating characteristics of the system. Various modifications or variations of the implementation of the features of this invention which have been described in conjunction with the above preferred embodiment will occur to those skilled in the art without departing from the true scope of the invention.

I claim:

1. An electronic control system having a central source of control and polling signals interconnected with a plurality of controlled terminal locations, the controlled terminal locations including in combination:

utilization circuit means at each controlled terminal location identified by a unique polling signal and having a control signal input terminal and responsive to signals applied thereon to be selectively rendered operative or inoperative thereby;

polling signal decoder means at each controlled terminal location for said utilization circuit means and having an input and at least one output terminal, and responsive to the unique polling signal identifying the controlled terminal location in which said polling signal decoder means is located when such unique polling signal is applied to the input terminal of said polling signal decoder means to produce an output signal on the output terminal thereof;

driver circuit means at each controlled terminal location connected between the output terminal of said polling signal decoder means and the input terminal of said utilization circuit means for such terminal location to selectively render said utilization circuit means operative or inoperative in response to the signals on the output terminal of said polling signal decoder means for such terminal location;

polling signal supply means coupled to the input terminals of all of said polling signal decoder means for applying polling signals thereto from the central source; and separate control circuit means at each controlled terminal location coupled to receive signals from said polling signal supply means and coupled to one of said driver circuit means and said utilization circuit means at such controlled terminal location for rendering said utilization circuit means at only such controlled terminal location inoperative in response to the absence of the receipt of polling signals by such control circuit means for a predetermined time interval from said polling signal supply means; each of said control circuit means at each of said controlled terminal locations operating independently of the control circuit means at other controlled terminal locations.

2. The combination according to claim 1 further including additional circuit means in each controlled terminal location, said additional circuit means coupled with at least said polling signal decoder means at the same controlled terminal location for supplying signals to the central source of control and polling signals indicative of the state of operation of said polling signal decoder means for such controlled terminal location.

3. The combination according to claim 2 wherein said additional circuit means is further coupled with the output of said driver circuit means for supplying signals representative of the state of the output of said driver circuit means to the source of control and polling signals.

4. The combination according to claim 1 wherein each of said control circuit means comprises a time-out circuit; and further including a source of clock pulses coupled to said time-out circuit for causing said time-out circuit to produce a reset signal on the output thereof after a predetermined time interval, the output of said time-out circuit being connected to said one of said driver circuit means and said utilization circuit means at the controlled terminal location at which said control circuit means is located for rendering said utilization circuit means inoperative whenever said reset signal appears, said time-out circuit having a reset input coupled with said polling signal supply means for resetting said time-out circuit in response to the presence of polling signals from said polling signal supply means to prevent reset pulses from appearing on the output of said time-out circuit.

5. The combination according to claim 4 wherein said time-out circuit is coupled with said driver circuit means.

6. The combination according to claim 1 wherein said polling signal decoder means at each of controlled terminal locations has a plurality of output terminals; and further including a plurality of utilization circuit means; and a plurality of driver circuit means, each driver circuit means comprising binary latch circuit means operated in response to signals appearing on different output terminals of said decoder means for selectively rendering operative and inoperative the utilization circuit means connected to said binary latch circuit means.

7. The combination according to claim 6 wherein said control circuit means comprises a time-out circuit means; and further including a source of clock pulses coupled to said time-out circuit means for causing said time-out circuit means to produce a reset output pulse on the output thereof after a predetermined time interval, said time-out circuit means having a reset input coupled to said polling signal supply means to cause said time-out circuit means to be reset in response to the presence of polling signals which normally occur at time intervals less than said predetermined time interval; and means coupling the output of said time-out circuit means to said driver circuit means to render said utilization circuit means inoperative whenever said reset output pulse is produced by said time-out circuit means.

8. The combination according to claim 7 wherein the output of said time-out circuit means is coupled with reset inputs of all of said driver circuit means at only the controlled terminal location in which said time-out circuit means is located for causing the output of said driver circuit means to render all of said utilization circuit means at such controlled terminal location inoperative in response to the occurrence of a reset pulse from said time-out circuit, irrespective of the state of the signals applied to said binary latch circuit means by said polling signal decoder means.

9. The combination according to claim 8 further including additional circuit means coupled with at least said polling signal decoder means, and having an output connected to said source of polling signals, for supplying signals representative of the operation of said polling signal decoder means to said source of control and polling signals.

10. The combination according to claim 9 wherein said additional circuit means is further coupled with the output of said binary latch circuit means for supplying signals to said source of control and polling signals representative of the state of operation of said binary latch circuit means.

* * * * *